J. W. BRYCE.
WEIGHING APPARATUS.
APPLICATION FILED SEPT. 16, 1914. RENEWED JAN. 6, 1919.
1,313,062.
Patented Aug. 12, 1919.
9 SHEETS—SHEET 6.
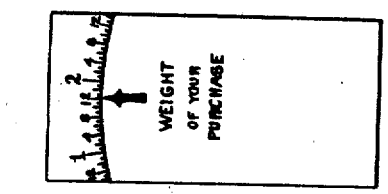
Fig. 13.
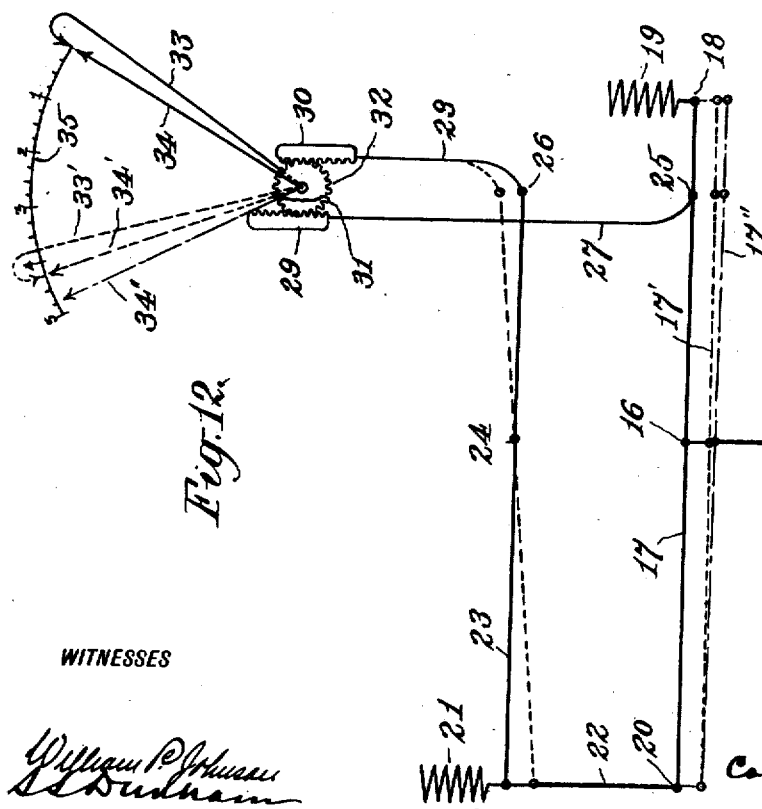
WITNESSES
INVENTOR
J. W. Bryce
HIS ATTORNEYS J. W. BRYCE.
WEIGHING APPARATUS.
APPLICATION FILED SEPT. 16, 1914. RENEWED JAN. 6, 1919.
1,313,062.
Patented Aug. 12, 1919.
9 SHEETS—SHEET 7.
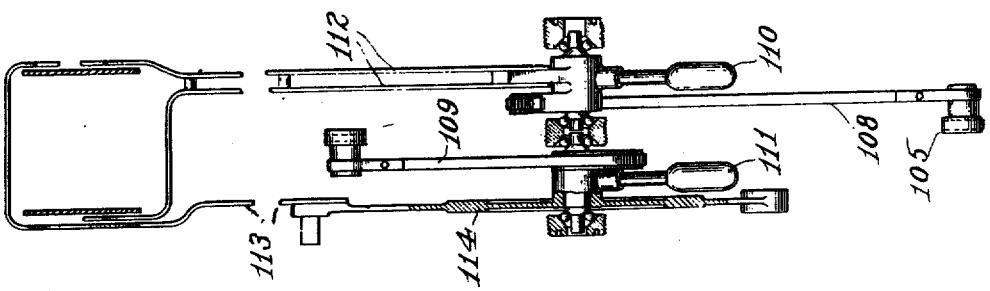
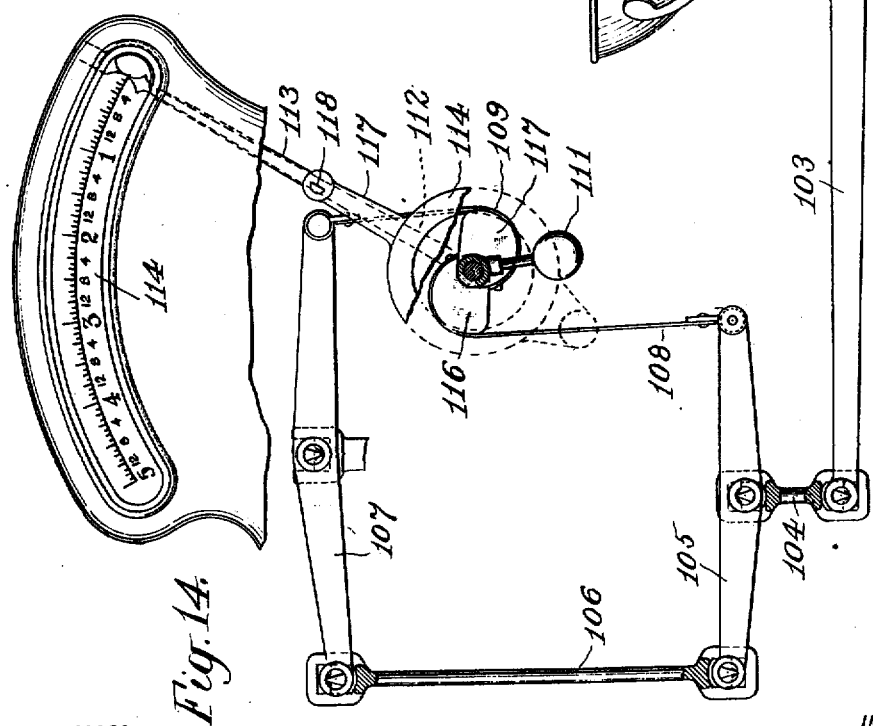
WITNESSES
William P. Johnson
S S Dunham
INVENTOR
J. W. Bryce
BY
Kerr, Page, Cooper & Hayward
HIS ATTORNEYS

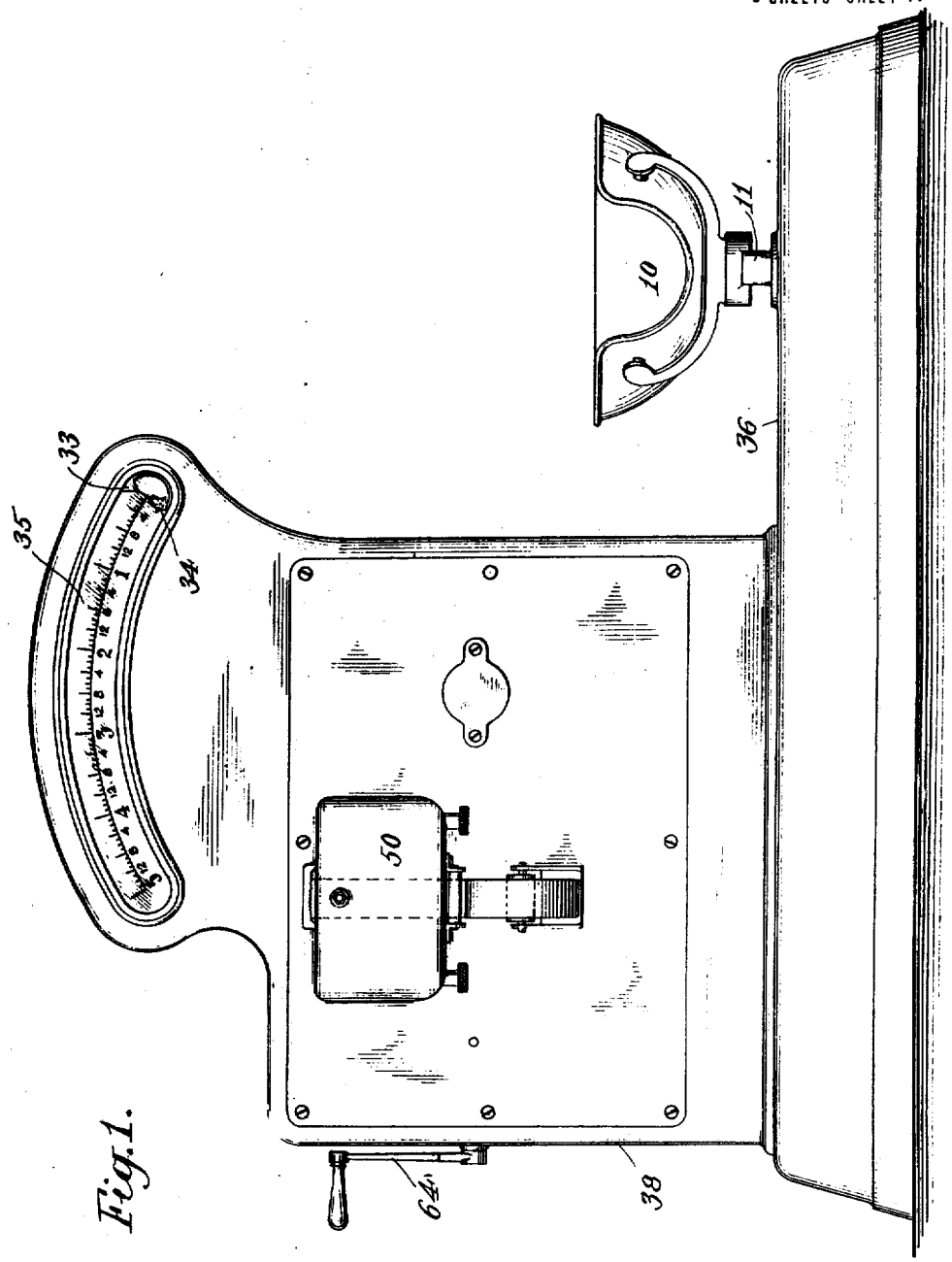

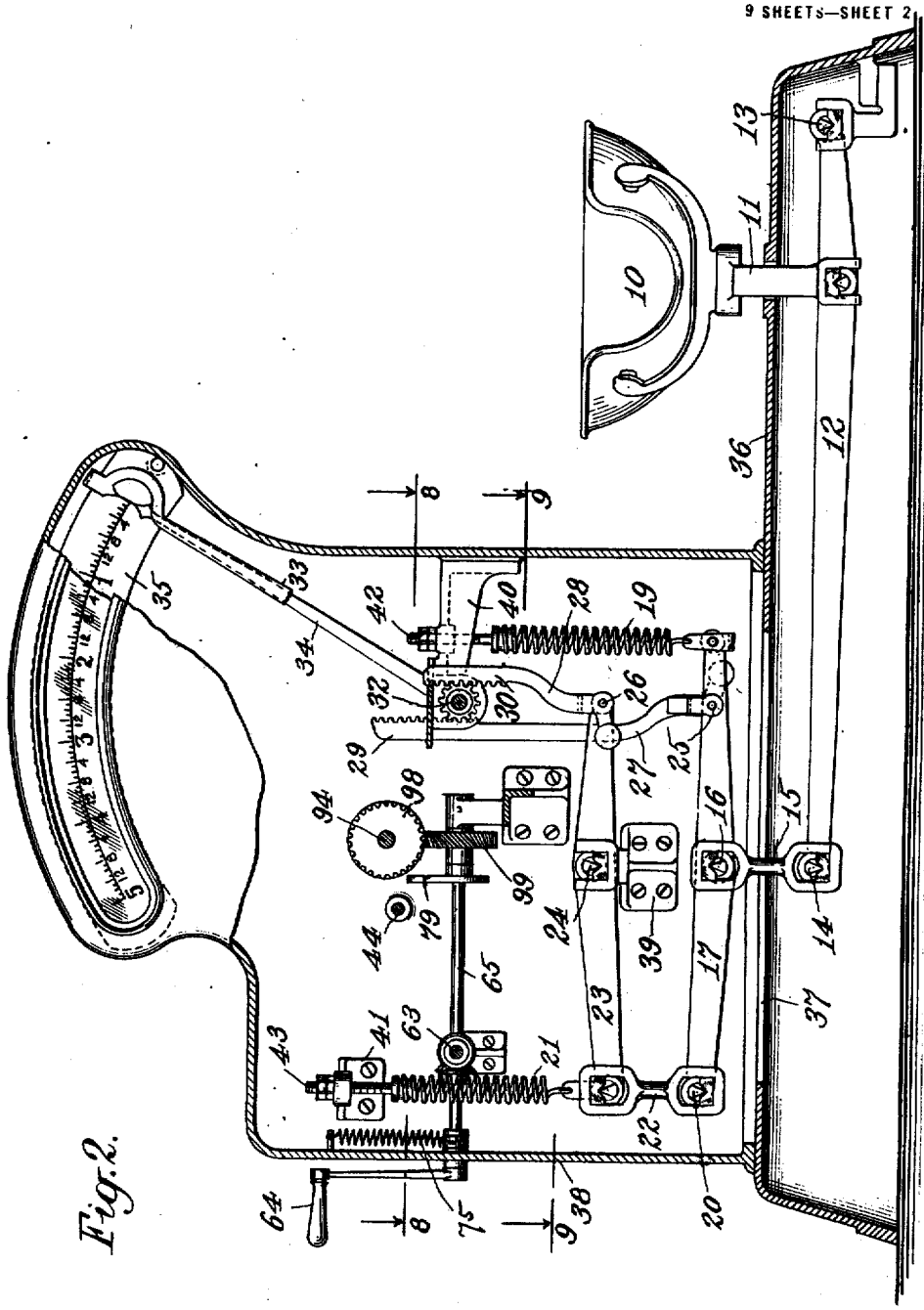

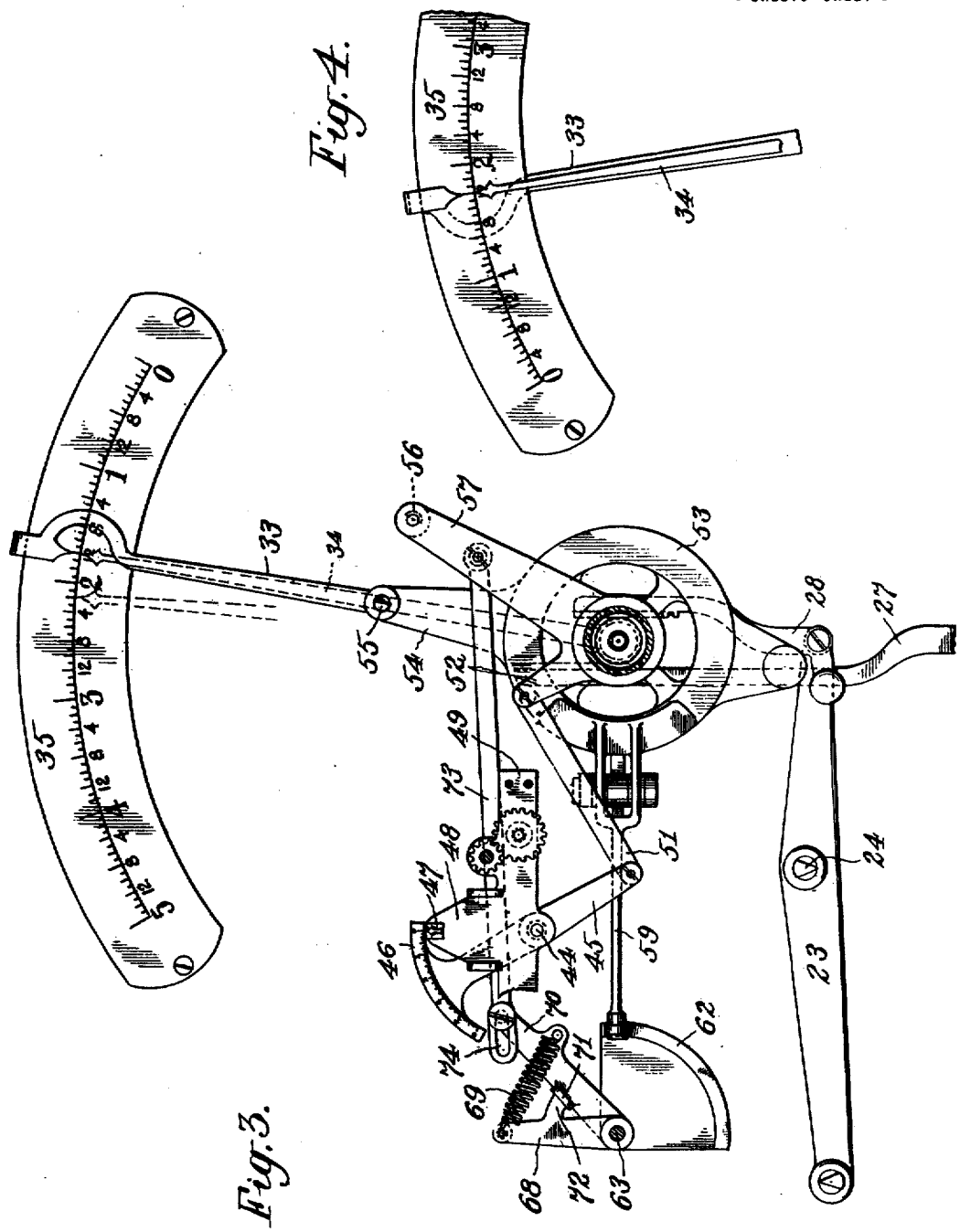

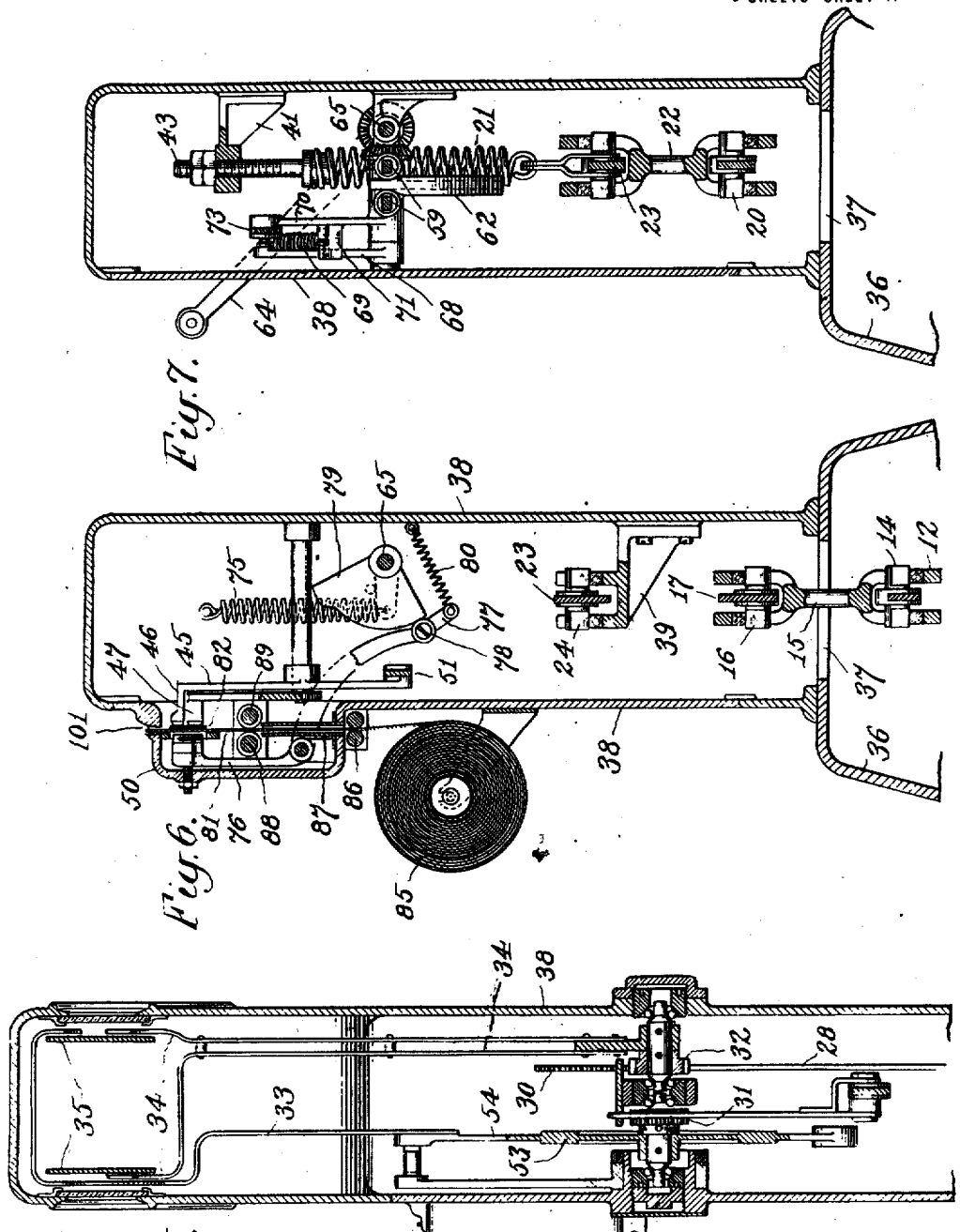

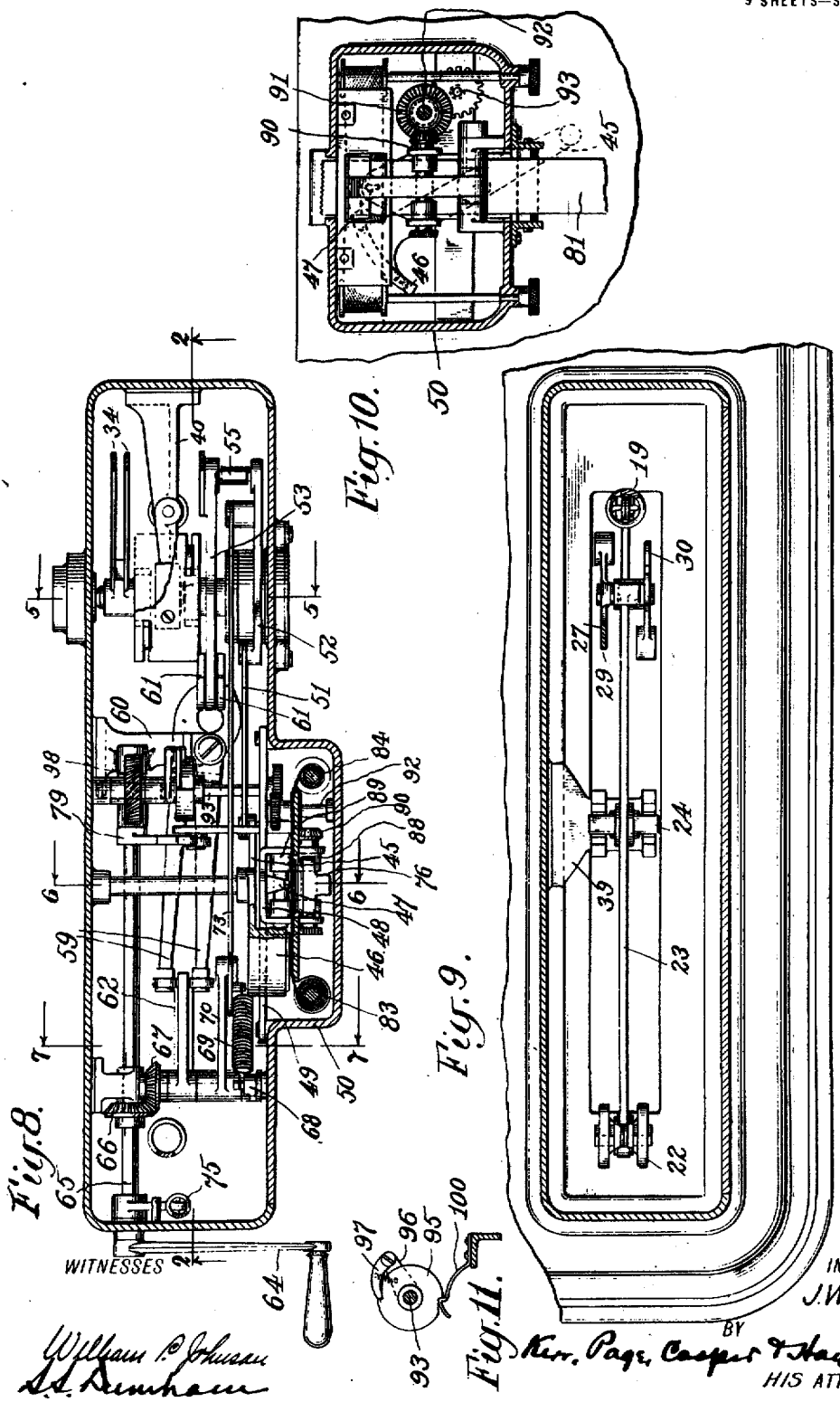

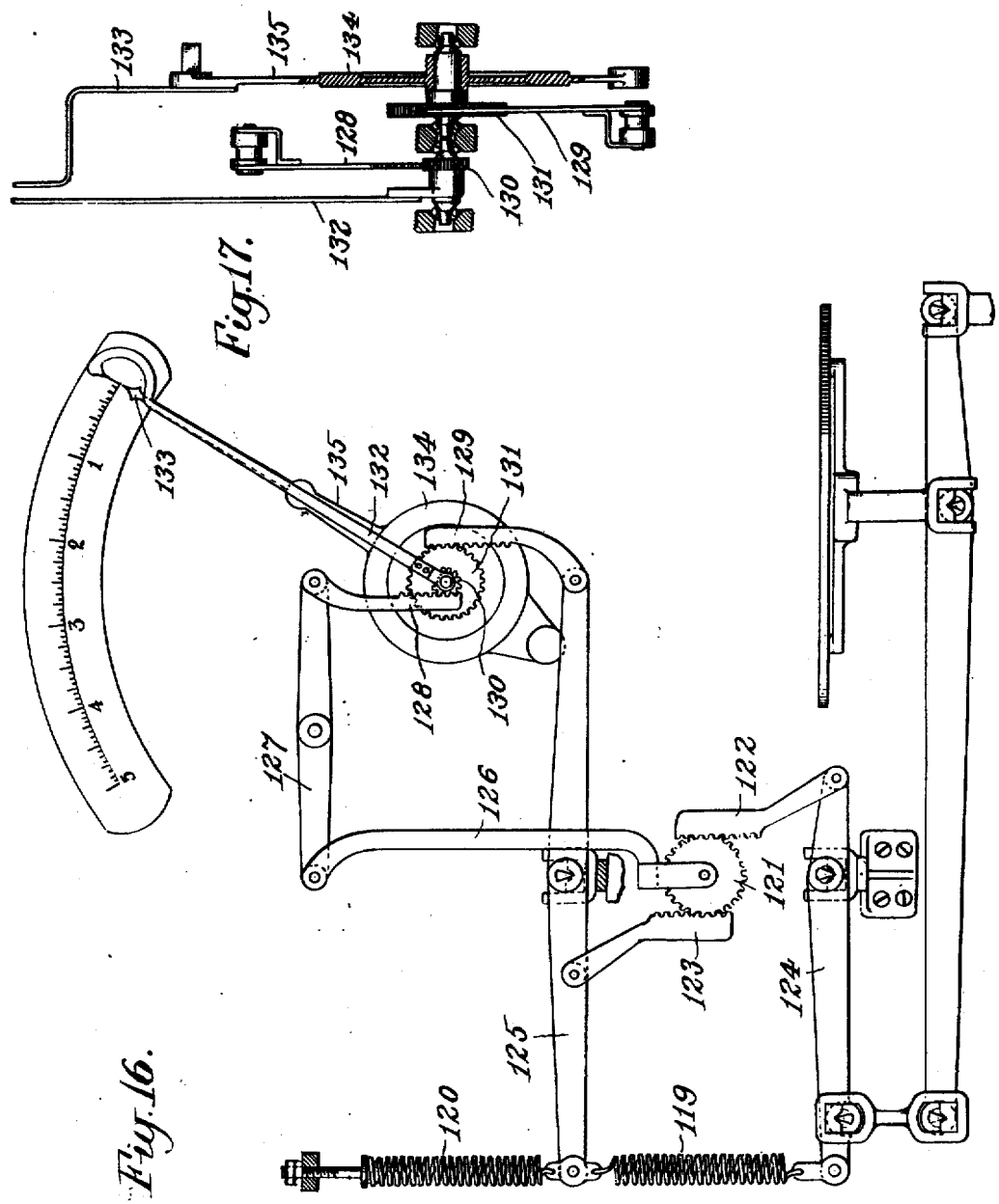

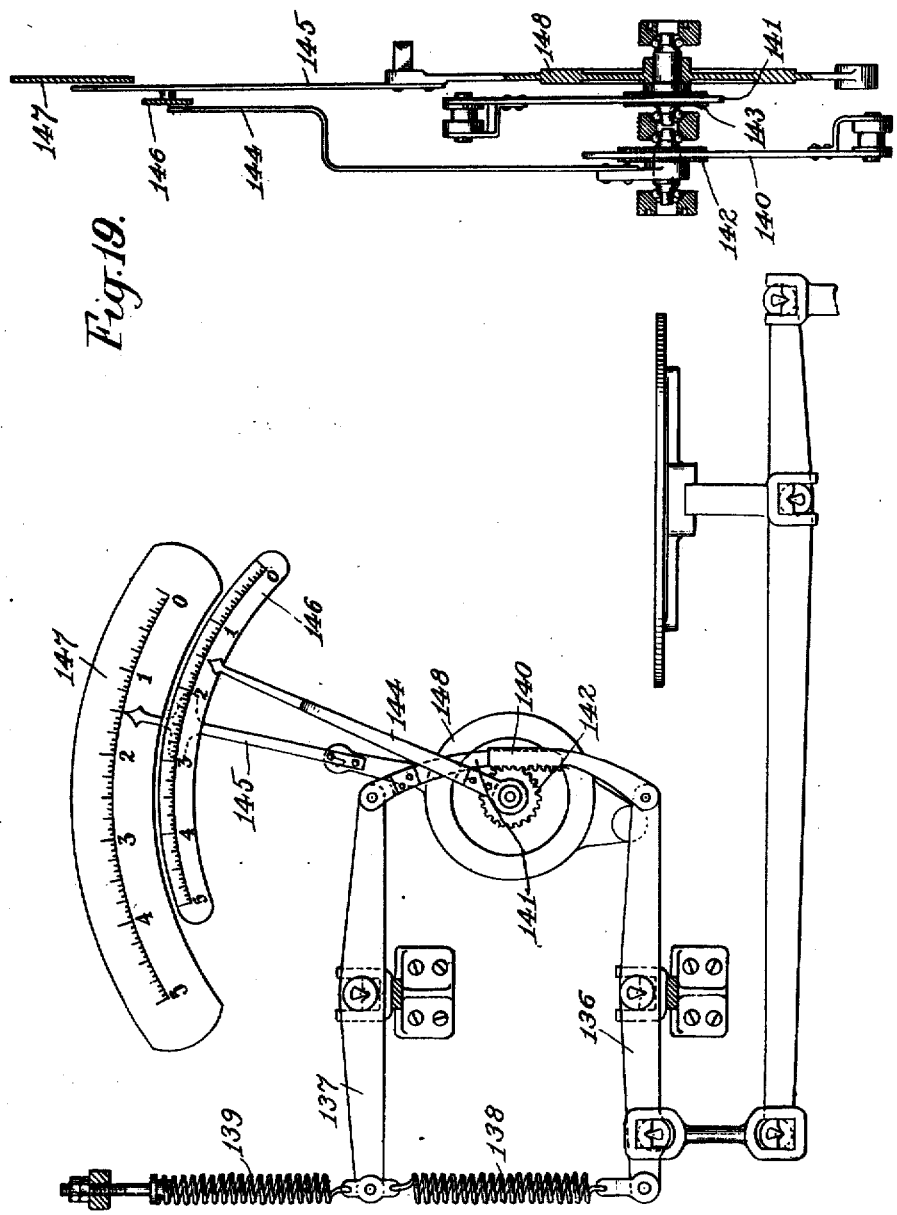

UNITED STATES PATENT OFFICE.

JAMES W. BRYCE, OF BLOOMFIELD, NEW JERSEY, ASSIGNOR TO COMPUTING-TABULATING-RECORDING COMPANY, OF NEW YORK, N. Y., A CORPORATION OF NEW YORK.

WEIGHING APPARATUS.

1,313,062.   Specification of Letters Patent.   Patented Aug. 12, 1919.

Application filed September 16, 1914, Serial No. 861,925. Renewed January 6, 1919. Serial No. 269,885.

*To all whom it may concern:*

Be it known that I, JAMES W. BRYCE, a citizen of the United States, residing at Bloomfield, in the county of Essex and State of New Jersey, have invented certain new and useful Improvements in Weighing Apparatus, of which the following is a full, clear, and exact description.

In apparatus for weighing commodities, and computing the cost or price, or printing the weight, or both, it is desirable, for the sake of accuracy in the computing or printing operation, to lock the weight-actuated or controlled element or elements after the same have come to rest. The laws in force in some localities, however, forbid "locking up the scale", for the reason that it opens the door to fraud upon the customer, in that material can be surreptitiously removed from the scale-pan without the fact being evidenced by the weight indicating mechanism. I have accordingly been led to devise my present invention, which has for its chief object to provide a weighing apparatus in which the weight-actuated or controlling member or mechanism that controls or sets the printing or computing mechanism can be locked, but leaving the scale-pan and indicating mechanism free. Movement of the latter, even during the printing or computing operation, will then give plain and unmistakable evidence that something has been removed from or added to the goods being weighed. Various embodiments of the idea are described herein. In its preferred form the invention includes what for convenience may be termed a "duplex weighing-element", comprising at least two members, each actuated or controlled by the weight of the goods. The two being capable of actuation or control independently of each other, either may be locked without affecting the other. The locked member can then be utilized in the printing or computing operations, leaving the other free and hence capable of indicating any change in the weight of the goods on the pan.

Several convenient and effective embodiments of the invention are illustrated in the accompanying drawings, in which, Figure 1 is a rear view of one form of the invention.

Fig. 2 is a vertical section (on line 2—2 of Fig. 8) showing the two weighing members of the duplex weighing element, the parallel springs which oppose the movements of the members by the weight of the goods, the scale pan connected with the members to actuate the same, and the pointers connected with the weighing members to indicate the weight of the goods on the pan.

Fig. 3 is a fragmentary detail view showing chiefly one of the weighing members, the mechanism for locking the weighing member after actuation thereof by the scale pan, and the type-member (of the printing mechanism) the setting of which is controlled by the locked weighing member. This figure also shows the scale and pointers as they appear to the salesman behind the counter.

Fig. 4 is a detail view showing the scale and pointers as seen by the customer in front of the counter.

Figs. 5, 6 and 7 are vertical sections on lines 5—5, 6—6, and 7—7, respectively, of Fig. 8.

Figs. 8 and 9 are horizontal sections on lines 8—8 and 9—9 of Fig. 2.

Fig. 10 is an elevational view of the printing mechanism from the rear, the casing thereof being in vertical section.

Fig. 11 is a detail view of part of the step-by-step mechanism for feeding the paper strip to the printing mechanism.

Fig. 12 is a purely diagrammatic view illustrative of the duplex weighing element as embodied in the construction shown in concrete form in Figs. 1 to 11 inclusive.

Fig. 13 is a view showing the ticket or check which is printed and delivered by the machine.

Fig. 14 is a diagrammatic rear view of an embodiment in which pendulums or weights are provided to oppose the movements of the weighing members by the scale pan, and Fig. 15 is a side view of the same, partly in vertical section.

Fig. 16 is a diagrammatic rear view of an embodiment in which springs that oppose the movements of the weighing members by the scale pan are arranged in series or in tandem instead of in parallel as in Figs. 2 and 12. Fig. 17 is a side view, partly in vertical section, of the mechanism by which the movements of the weighing members of Fig. 16 are communicated to the weight-indicating pointers.

Fig. 18 is a diagrammatic rear view of a tandem-spring construction employing another form of mechanism for communicating the movements of the weighing elements to the pointers, and Fig. 19 is a side view, partly in vertical section, of the mechanism just referred to.

The principle upon which the preferred form of the invention operates will be readily understood from Fig. 12, in which the scheme is illustrated diagrammatically. Referring thereto, 10 designates a scale pan, pivotally connected by a stem 11 to a scale beam or lever 12 which is fulcrumed at the point 13. At the other end, 14, the beam is connected by a link 15 to the center 16 of a floating lower member or lever 17, connected at its right end 18 to a contractile spring 19 and at its left end 20 to a similar spring 21 through the medium of a link 22. The upper member or lever 23 is connected by its left end to the link 22 and spring 21, and is fulcrumed at 24; the fulcrum 24 being fixed and located directly above the point 16. At the points 25, 26, equidistant from 16 and 24, the members 17, 23 are pivotally attached to two vertical members or links 27, 28, carrying at their upper ends a pair of racks 29, 30, meshing with two co-axial but independently rotatable gears 31, 32 on opposite sides of the latter. These gears carry pointers 33, 34, traversing scale 35.

From the foregoing it is clear that when a weight is placed on the pan 10 the same is supported by the springs 19, 21 equally; that is, each spring supports half the weight. It is also clear that if the springs are equal in strength the weight on the pan will extend the springs equally and hence the new position of the member 17 (indicated by the dotted line at 17') will be parallel to the original position. At the same time, the member 23 will be rocked counterclockwise on its stationary fulcrum 24. The racks 29, 30 will therefore impart to their gears 31, 32, movements equal in extent and the same in direction, that is, counterclockwise, thereby carrying the pointers 33, 34 in unison over the scale 35 to the positions 33', 34', for example. Either member 17, 23 can now be locked (for example the first named) without affecting either pointer. But suppose a change, for instance an increase, is made in the weight on the pan 10. The lever 23 being locked, the spring 21 cannot be extended farther, and the lever 17 therefore rocks on the pivot 20 as a fulcrum, say to the position shown by the broken line 17'', and extends the spring 19. Nevertheless, the spring 19 still bears only half the weight, and since the points 25, 26 are in vertical alinement with the axis of the gears 31, 32, the extent of the movement imparted to the pointer 34 from its position 34' (say to the position 34'') bears the same ratio to the increment of the weight as the original movement bore to the original weight. In short, the movement of the pointer 34 is directly proportional to the weight on the pan, after the member 23 is locked, as well as before. Hence any change in the weight after one pointer is locked is evidenced by a movement of the other out of register with the first; and, in the construction shown, this movement of the unlocked pointer is directly proportional to the change in the weight, whether such change be positive or negative. Of course numerous modifications can be made without departing from the spirit of the invention, as will be readily understood by those skilled in the art. For example, the springs need not be of equal strength; in which case such alteration in the relative positions of the points of attachment or suspension, some or all of them, can be made as may be necessary to give accurate readings and imprints. Thus if the spring 21 be the stronger, the point 16 can be shifted toward the link 22 so as to keep the movements of the racks 29, 30 equal in extent. Or the gears may be of different size, etc.

A practical embodiment of the principle illustrated diagrammatically in Fig. 12 is shown in Figs. 1 to 11 inclusive, in which the corresponding elements are designated by the same numerals. In the embodiment referred to, the beam 12 is inclosed in a base 36 having an opening 37 through which the link 15 extends into the upright housing 38 which incloses the "duplex weighing element" 17, 23, and other parts of the apparatus. The fulcrum 24 is supported by a bracket 39, and the springs 19, 21, are supported by their upper ends by the brackets 40, 41, through the medium of the threaded stems 42, 43. Preferably there is a scale 35 at both front and rear of the housing, as shown in Fig. 5, and the pointers are provided with indexes traversing both scales, so that when the salesman and the customer are on opposite sides of the counter the movements of the indexes will be visible to both persons.

The apparatus illustrated in Figs. 1 to 11 is designed to print the weight on a suitable check for delivery to the customer, and for this purpose the following mechanism is provided.

On the shaft 44 (Figs. 3 and 8) parallel to the axis of the gears 31, 32, (Fig. 12) is a lever 45, carrying at its upper end an arc-shaped member or printing sector 46 on which are characters for printing a facsimile of the scale 35, and below the sector is a fixed character or type 47 for printing a pointer or index. The swinging scale-sector 46 is shifted past the index 47 in unison with the pointers 33, so as to give the same reading as the pointer 33 gives on the scale 35. By means of an ink ribbon and a suitable platen a check can then be printed, from which the weight can be read as on the scale 35. Such a printed check is shown in Fig. 13. The words "Weight of your purchase" or any other desired words or characters can be printed on the check by providing suitable type therefor, preferably carried by the member 48 that supports the index type 47. This member 48 is carried on the upper edge of a bar 49 (see also Fig. 10) fixed across the small chamber 50 formed in the rear wall of the housing 38.

The lever 45 is rocked to set the printing sector 46 by a link 51 connected with an arm 52 coaxial with the gear 31 but movable independently thereof. Fixed to the gear 31 is a friction disk or annulus 53 having an arm 54, to which the pointer 33 is conveniently attached as clearly shown in Fig. 5. This arm carries a stop 55 to coöperate with a similar stop 56 on an arm 57 rigidly connected with the arm 52.

The foregoing parts being properly proportioned, it is clear that if the disk or annulus 53 and arm 54 are locked after the pointer 33 comes to rest and the arms 52, 57 are rocked (counterclockwise as seen in Fig. 3) the latter will eventually be arrested by the coöperation of the stops 55, 56, with the sector 46 properly set for printing the weight indicated by the pointer 33 on the scale 35. This locking of the arm 54 is effected by a clamp 59 composed of two members pivoted on a bracket 60 (Fig. 8) and having friction jaws 61 embracing the edge of the disk or annulus 53 so that when the opposite ends of the members are spread apart the jaws will grip the annulus and hold the same firmly. The spreading or actuation of the members 59 is effected by a quadrant-cam 62 fixed on a shaft 63 (Fig. 3) which is rocked by a suitable operating handle 64 (Fig. 8) through the instrumentality of a rock-shaft 65 and bevel gears 66, 67. Fixed on the shaft 63 is an arm 68, connected by a coil spring 69 to an arm 70 loose on the same shaft, which spring serves to hold the last named arm normally in the position shown in Fig. 3 with respect to the arm 68, with the abutment or stop 71 against the finger 72. The arms 70 and 57 are connected by a link 73, the connection with arm 70 being made by a slot 74 in the link. It will therefore be seen that when the handle 64 is rocked the first effect is to lock the disk 53 and arm 54. During this operation the stud on the end of arm 70 moves idly through the slot 74, but when the locking operation is completed the stud reaches the end of the slot, and the further movement of the arms 68 and 70 then swings the arms 57, 52 until the same are arrested by the stop 55 as previously described. Further movement of the operating handle 64 then separates the arm 68 from the arm 70, extending the spring 69. When the handle is released by the operator a spring 75, Figs. 2 and 8, restores to individual position the parts actuated by the handle.

After the printing sector 46 is set as described in the preceding paragraph the printing is effected by the following mechanism. The platen 76 is fixed at its lower end to a short shaft which at one end has fixed to it a forwardly and downwardly extending arm 77 (Fig. 6) having a roller 78 held against a quadrantal cam 79 on the shaft 65 by a spring 80. While the shaft 65 is being rocked by the handle 64 to lock the controlling arm 54 and set the sector 46 the concentric portion of the cam moves idly past the roller 78; then the rise at the upper edge of the cam reaches the roller and swings the platen clockwise (as seen in Fig. 6), thereby pressing the paper check-strip 81 and the ink ribbon 82 firmly against the sector 46 and index-type 47. Upon release of the handle the springs 75 and 80 restore the cam and the platen to their initial positions.

The ink ribbon 82 is carried by two spools 83, 84, Fig. 8, and is fed from one spool to the other by any suitable mechanism not shown.

The paper check-strip 81 is drawn from a roll 85, Fig. 6, rotatably supported outside the housing 38, and passes between two guide rollers 86 and through a guide chute 87 to the friction feed-rollers 88, 89. The latter rollers are geared together at one end, as shown in Fig. 8, and at the other end the roll 88 is provided with a bevel gear 90 meshing with a similar gear 91 (Fig. 10) on a short shaft 92. The shaft 92 is geared to the shaft 93, which is alined with the shaft 94 (Fig. 2) and carrying a two-toothed ratchet 95, Figs. 8 and 11. On the shaft 94 is an arm 96 carrying a pawl 97 engaging the ratchet, and the shaft also has a spiral gear 98 meshing with a similar gear 99 on the shaft 65. While the operator is rocking the handle 64 to its extreme position, the arm 96 is rocked clockwise (as seen in Fig. 11), thereby retracting over the ratchet the pawl 97 which moves in a plane adjacent to that of the spring holding pawl 100. Finally the pawl 97 engages the lower tooth of the ratchet. Then when the shaft 65 is rocked by the spring 75 the pawl 97 is advanced, thereby rotating the ratchet 95 a half turn and rotating the feed rollers 88, 89, through the medium of the gearing described. The printed portion of the check-strip is thus fed up through the slot 101 in the top of the chamber 50 and is torn off against the serrated edge of the slot for delivery to the customer, leaving a fresh portion of the check-strip in position for the next operation of the machine.

Figs. 14 and 15 show a convenient and simple method of embodying the invention in a scale of the so-called pendulum type, wherein the scale pan is balanced against a swinging weight. In the figures referred to, the scale pan 102 and scale beam 103 are connected by a link 104 to the lower member 105, which is connected at its left end by a link 106 to the upper member 107. At the right, the two members are connected by suitable straps 108, 109 to the pendulums 110, 111, respectively. In Fig. 14 the two weights or pendulums are directly in line and hence only the one in front, designated by 111, can be seen, but both are clearly shown in Fig. 15. The pointers 112, 113 are connected to the pendulums 110 and 111 respectively, the last named pointer through the medium of the clutch disk 114 on which it is mounted and by which the member 107 and weight 111 are locked through the medium of suitable devices such, for example, as those shown for a similar purpose in Figs. 3 and 8. Inasmuch as the weights swing in circular arcs, the force exerted upon them by gravity and effectively opposing the force exerted by gravity on the goods in the scale pan varies as the cosine of the angle between the center of gravity of the weights and the horizontal, measured on an arc whose center is the axis of the pendulums. Hence, in order that the divisions of the scale may be uniform throughout, the straps are wound not upon cylindrical surfaces but on cam-shaped members 116, 117. As the precise profile-curvature that these members must have for the purpose is well understood it need not be discussed herein.

In the construction illustrated in Figs. 14 and 15, it is clear that if the parts are so designed and proportioned as to cause the pointers to move in unison when the member 107 is free the locking of this member will have no effect upon the pointer 112, actuated by the other member, 105. Hence any change in the weight on the pan after member 107 is locked will be indicated by the pointer 112.

The arm 118 of the clutch disk 114 is provided with a stop 118' for the same purpose as the similar stop 56 in Fig. 3, namely, to determine the setting of suitable printing mechanism or other devices. Printing mechanism like that illustrated in Figs. 3 to 10 inclusive may be used, and illustration of the same in connection with Figs. 14 and 15 is therefore unnecessary.

In the construction shown in Figs. 16 and 17 two springs, 119, 120, are employed, but are arranged in series or tandem instead of in parallel as in Fig. 12. With tandem springs it is clear that the lower end of the lower spring will sink farther under the influence of a given weight on the pan than will the lower end of the upper, the ratio being 2:1 if the springs are of equal strength. Compensation for this inequality of movement can be made in various ways, as for example in the manner illustrated. Here the employment of a floating gear 121 meshing with racks 122, 123, connected with the members 124, 125, and itself connected (as through the medium of the link 126 and lever 127) with the rack 128 to actuate the latter, transmits the movement of the lower end of spring 119 to the rack 128, and the rack 129 is actuated directly by the member 125. With the parts proportioned as shown, the movement of the rack 128 is somewhat less than half as fast as that of rack 129. The diameters of the gears 130, 131 are therefore in the same ratio as are the movement of their actuating racks, with the result that the pointers 132, 133, connected with the gears 130, 131, respectively, move in unison when the members 124, 125 are both free. If now the member 125 be locked by means of the stop disk 134 (connected with the gear 131 and carrying the stop arm 135 on which the pointer 133 is mounted) the lower end of spring 120, the upper end of spring 119, and the racks 123, 129, are thereby fixed. Hence any change in the weight on the pan will cause a change in the extension of the spring 119 only. This extension increment (negative or positive, according as weight is removed from or added to the pan) will move the rack 122 only half as far as would be the case if the spring 120 were free. But since the rack 123 is stationary, the movement imparted to the gear 121 and rack 128 by the weight increment bears the same ratio to the original movement of the parts mentioned as the weight-increment bears to the original weight. In short the pointer 132 will indicate the correct weight of the goods on the pan even after the member 125 is locked. In mathematical language, if with both members 124 and 125 free a weight $w$ moves rack 122 a distance $x$, rack 123 will move a distance $x/2$; and since the vertical movement of the gear 121 is always half the difference of the movements of the racks the gear will move up a distance $x/4$. Assume now that the member 125 is locked, and that the weight on the pan is increased to, say $2w$. The weight-increment is therefore $w$. If the spring 120 were free to stretch, the rack 122 would move up a further distance $x$; but since spring 120 cannot stretch, the further movement of rack 122 is only $x/2$. The additional movement of rack 123 being zero, the additional vertical movement of gear 121 is $(x/2-0) \div 2 = x/4$. It is therefore seen that the movement imparted to rack 128 and gear 130 by a given weight is not varied by locking the member 125, and that any change in the weight on the pan after member 125 is locked will be correctly indicated by the pointer 132 if the original weight were correctly indicated thereby.

It will be understood that the movement of the rack 128 under the influence of a certain weight depends not only upon the ratio of the strengths of the springs but also upon the ratio of the levers to which racks 122 and 130

123 are connected and upon the ratio of the arms of the lever 127. In the example given above, it was assumed that these ratios are all unity. Thus, if in lever 127 the arm to which link 126 is connected be reduced relatively to the other, the movement of rack 128 will be increased and the diameter of gear 130 must be correspondingly increased to make the pointer 132 move in unison with the other. Similarly, if the fulcrum of lever 124 be shifted toward the right, thereby diminishing the upward movement of the rack 122 for a given weight, the change can be compensated by shifting the fulcrum of lever 125 toward the right to produce a suitable diminution of the movement of rack 129. These and other changes, however, are well understood by persons skilled in the art and therefore need not be elaborated herein.

In Figs. 18 and 19 the lever 136 and 137. to which the tandem springs 138, 139 are attached, are both connected directly to the racks 140, 141, which actuate the gears 142, 143 and pointers 144, 145. Hence the rack 140 will move farther under the influence of a given weight than will the rack 141. The difference can be compensated for preferably by the method illustrated. Here the scale 146, which the pointer 144 traverses, is carried by the pointer 145 and hence moves therewith. Consequently the scale mentioned is stationary relative to the pointer 144. Thus, assuming that the springs are of equal strength, that the levers 136 and 137 have the same arm-ratio, and that the gears 142, 143 are of the same diameter, the angular movement of pointer 145 will be just twice that of pointer 144 for a given weight when both springs are free. The result is that if pointer 144 swings one degree the pointer 145 will swing two; but the scale 146 will also have moved one degree and hence the movement of pointer 144 relative to its scale will be one degree. In short, the reading on scale 146 will be the same as on scale 147; assuming, of course that the two scales are properly proportioned. In the drawing the scale 146 is nearer the axis of its pointer than is the other scale and hence its divisions must be smaller in the same ratio. On the other hand, when the lever 137, spring 139, pointer 145 and scale 146 are locked, as by means of the disk 148 connected with the gear 143, the upper end of spring 138 becomes fixed and its lower end will therefore have proportionately less movement for any change in the weight than it would have if spring 139 were free. The movement of pointer 144 relative to the now stationary scale 146 will, for a given change of weight, therefore be the same as it would be if both springs were free and scale 146 moving. The reading on scale 146 is accordingly correct whether spring 139 be locked or not, It is of course clear that the printing mechanism illustrated in Figs. 3 to 10 inclusive can be used with the constructions shown in Figs. 16, 17, 18, 19.

It is to be understood that the invention is not limited to the embodiments herein specifically illustrated and described, but can be embodied in other forms without departure from its proper spirit and scope.

I claim:

1. The combination in a weighing machine with a scale pan of two means for indicating the total weight placed in the pan and intermediate mechanism for respectively actuating said means according to the amount of displacement of the scale pan, one of said weight indicating means and the intermediate actuating mechanism therefor being at all times free to operate, and means for locking the other weight indicating means and the intermediate actuating mechanism therefor in the position to which it was brought by the weight originally placed in the pan.

2. In a weighing apparatus, the combination with a scale pan, of two total weight indicating means, mechanism for actuating said means from said pan to impart to such means a movement variable with the displacement of the pan, said mechanism including a device for imparting movement to one only of said weight indicating means and a second device for imparting movement to the other weight indicating means only, and means coöperating with one of said weight indicating means to lock its actuating device against movement while leaving the other device and the indicating mechanism controlled thereby at all times free to operate.

3. In a weighing apparatus, the combination with a scale pan, of two weighing levers, means whereby they are operatively connected with one another, a lever connection between one of said levers and the scale pan whereby such weighing levers will be simultaneously and similarly operated by displacements of the scale pan, yielding devices connected to the weighing levers respectively to independently oppose the movements of the scale pan, mechanism controlled by one of said weighing levers only, means coöperating with said mechanism for locking its lever while leaving the other free to move, and two total weight indicating means controlled by said weighing levers respectively.

4. In a weighing apparatus, the combination of a scale-pan, a weighing lever connected with the scale-pan for actuation thereby, weight-indicating means controlled by the lever, said scale-pan, weight-indicating means and the lever controlling the latter being at all times free, a second weighing lever connected with the first for actuation simultaneously with the first, means for locking the second lever, and mechanism controlled by the second lever.

5. In a weighing apparatus, the combination with a scale pan of two levers, means whereby both of said levers are caused to be moved to a like extent in response to a weight placed upon the scale pan and in proportion to the amount of such weight, mechanism controlled by the movement of one of said levers only, means coöperating with said mechanism for locking its lever while leaving the other free to move, and total weight indicating means controlled by both of said levers.

6. In a weighing apparatus, the combination with a scale pan, of two levers, means whereby the levers are actuated from the scale pan, two weight indicating means, means whereby said levers respectively are caused to actuate the weight indicating means in response to a weight placed upon the scale pan and each to the same extent and proportionate to such weight, and means for locking one of said weight indicating means and its actuating lever, while leaving the other weight indicating means and lever free and in operative connection with the scale pan.

7. In a weighing apparatus, the combination of a scale pan, a movable element, means whereby said element is actuated in response to a weight placed upon the scale pan and to an extent corresponding to such weight, a second movable element connected with the scale pan and movable in correspondence with the weight thereon, a clutch member connected with said second element, and means to engage and hold the clutch member stationary and thereby lock the second element.

8. In a weighing apparatus, the combination of a scale pan, a movable device, means whereby said device is caused to be responsive to the weight upon the scale pan, weight indicating means controlled by said device, a rotary device, operative connections between the same and the scale pan, whereby it will be moved in correspondence with the weight placed on said pan, a clutch disk rigidly connected with the rotary device to turn therewith, and means for engaging the disk and holding the same stationary.

9. In a weighing apparatus, the combination of a scale-pan, a lever connected with the scale-pan for actuation thereby, weight-indicating means controlled by the lever, a second lever, means whereby said last named lever is connected with the first for actuation thereby and permitting independent movement of the first, a movable controlling element connected with the second lever, and means operable at will to lock the controlling element and the second lever.

10. In a weighing apparatus, the combination of a scale-pan, a lever connected with the scale-pan for movement in correspondence with the weight of goods on the scale-pan, weight-indicating means controlled by the lever, a second lever, means whereby said last named lever is connected with the first for movement in correspondence with the weight of goods on the scale-pan, a controlling element actuated by the second lever, and means to lock the controlling element, said locking means leaving the first lever and the weight-indicating means free to respond to change in the weight of goods on the scale-pan.

11. In a weighing apparatus, the combination of a scale-pan, weighing devices connected with the scale-pan for movement in correspondence with the weight of goods on the scale-pan, at least one of said devices being movable independently of the rest in correspondence with change in the weight of goods on the scale-pan, and means for locking another of the devices against movement by change in the weight of goods on the scale-pan.

12. In a weighing apparatus, the combination of a scale-pan, a lever connected with the scale-pan for actuation thereby, weight-indicating means connected with the lever, a second lever, means whereby said last named lever is pivotally connected with the first for actuation thereby, and means for locking the controlling device and the second lever, the first lever and the weight-indicating means being left free for movement in correspondence with change in the weight of goods on the scale-pan.

13. In a weighing apparatus, the combination of a lever having a fixed fulcrum, a controlling member connected with one arm of the lever for actuation thereby, means to lock the controlling member and the lever, a movable element connected with the other arm of the lever, a floating lever having an arm connected with the first lever through the medium of the movable element to actuate the first lever, weight-indicating means connected with the other arm of the floating lever for actuation thereby, and a scale-pan connected with the floating lever to actuate the same.

In testimony whereof I affix my signature in the presence of two subscribing witnesses.

JAMES W. BRYCE.

Witnesses:
M. LAWSON DYER,
S. S. DUNHAM.